US005300859A

United States Patent [19]

Yatsiv et al.

[11] Patent Number: 5,300,859

[45] Date of Patent: Apr. 5, 1994

[54] IR-RADIATION SOURCE AND METHOD FOR PRODUCING SAME

[75] Inventors: Shaul Yatsiv, Jerusalem; Amnon Gabay, Mevasseret Zion, both of Israel

[73] Assignee: Yissum Research Development Company of the Hebrew University of Jerusalem, Jerusalem, Israel

[21] Appl. No.: 671,642

[22] Filed: Mar. 19, 1991

Related U.S. Application Data

[63] Continuation-in-part of Ser. No. 271,218, Nov. 14, 1988, abandoned.

[30] Foreign Application Priority Data

Nov. 12, 1987 [IL] Israel ........................................ 84463

[51] Int. Cl.[5] ........................ H01J 17/20; H01J 61/30; H01S 3/22

[52] U.S. Cl. .................................... 313/573; 313/634; 315/248; 372/60; 331/94.1

[58] Field of Search ................ 250/504; 313/573, 234, 313/637, 610, 635, 634; 315/248, 267; 372/60, 61; 331/94.1

[56] References Cited

U.S. PATENT DOCUMENTS

| | | | |
|---|---|---|---|
| 672,451 | 4/1901 | Moore | 313/607 |
| 3,393,372 | 7/1968 | Vickery et al. | 372/55 |
| 3,428,914 | 2/1969 | Bell | 313/634 X |
| 3,514,604 | 5/1970 | Grojean | 313/607 X |
| 3,577,069 | 5/1971 | Malnar et al. | 313/94.1 X |
| 3,609,587 | 9/1971 | Kolb, Jr. et al. | 313/634 X |
| 3,984,727 | 10/1976 | Young | 315/248 X |
| 4,242,645 | 12/1980 | Siemsen et al. | 372/60 |
| 4,485,333 | 11/1984 | Goldberg | 313/607 X |

FOREIGN PATENT DOCUMENTS 3617110 11/1987 Fed. Rep. of Germany .

OTHER PUBLICATIONS

T. K. McCubbin, Jr. and Yu Hak Hahn, "Infrared Emission of $CO_2$–$N_2$–He Plasmas", vol. 57: pp. 1373–1375, Nov. 1967, *Journal of The Optical Society of America.*

J. P. S. Haarsma, G. J. De Jong and J. Agteroenbos, "The Preparation and Operation of Electrodeless Discharge Lamps" -A Critical Review, vol. 29B, pp. 1–18, *Spectrochimica Acta*, Pergamon Press, 1974.

*Primary Examiner*—Sandra L. O'Shea

*Attorney, Agent, or Firm*—Scully, Scott, Murphy & Presser

[57] ABSTRACT

A source of IR-radiation, having an enclosure defining between its walls a sealed-off, electrode-less chamber, the walls having at least one portion transparent to IR-radiation, and the chamber containing a gas mixture of at least one, molecular, IR-active gas, of at least one buffer gas and of at least one noble gas. A method for producing a source of IR-radiation is also described and claimed.

13 Claims, 2 Drawing Sheets

IR-RADIATION SOURCE AND METHOD FOR PRODUCING SAME

This application is a continuation-in-part of application Ser. No. 271,218, filed on Nov. 11, 1988 and now abandoned.

BACKGROUND OF THE INVENTION

The present invention relates to sealed-off, molecular gas-discharge sources, without internal electrodes, radiating at discrete, non-coherent and spontaneous emission frequencies in the infra-red (IR) spectrum, and to a method of producing such sources.

Sealed-off, as opposed to non-sealed continuous flow, molecular gas-discharge IR sources are known in the art. These sources are, however, in general of short life span due to dissociation and/or depletion of the IR emitting gas during operation and are weak due to non-radiative relaxation of the excited molecules. Also, the ratio of the IR output to the input power of these known sources, is low. In order to overcome some of these shortcomings, solutions were suggested which include rather complicated structures, such as the device described in Robert A. Young's U.S. Pat. No. 3,984,727 and the device described in the U.K. patent number 1,591,709, to R. S. Webley.

SUMMARY OF THE INVENTION

It is therefore an object of the present invention to ameliorate the disadvantages of the prior art devices and to provide IR-radiating sources of simple structure capable of emitting narrow spectral lines at discrete spontaneous emission frequencies characteristic of the molecular rotation—vibration transition band of one or several gas species.

It is a further object of the present invention to provide IR-sources which operate continuously for at least several months, have a power output, at selected frequencies of at least several milliwatts, and a power efficiency which is such that the specific IR output power at these frequencies is in the order of several percent or even tens of percent, of the total power needed to operate these sources.

These and other objects are achieved by providing a source of IR-radiation comprising an enclosure defining between its walls a sealed-off, electrode-less chamber, said walls having at least one portion transparent to IR-radiation, and said chamber containing a gas mixture of at least one, molecular, IR-active gas, of at least one buffer gas and of at least one noble gas, said source of IR-radiation emitting discrete, solely noncoherent, spontaneous emission frequencies in the IR-spectrum characteristic of the molecular rotation-vibration transition band of said at least one molecular IR-active gas.

In the practice of the present invention, the IR-active gas, for example, $CO_2$, is excited, by low power, to its rotational-vibrational state; dissociation or other chemical reaction of the IR-active gas is not necessary. Thus, for example, the $CO_2$, in the practice of the present invention, need not undergo dissociation to oxygen and carbon monoxide to allow, for example, the oxygen to attain a repulsive neutral excited state by quasi-resonant energy transfer as would occur, for example, by interaction with a noble gas in a metastable state. Indeed, the noble gas of the present invention merely serves to assist initiation of the gas mixture discharge and increases the concentration of electrons in the chamber; no metastable states are created and the gas mixture does not undergo metastable states.

The IR-radiation of the present invention is created by decay of the IR-active molecule from its rotational-vibrational states to the ground state.

The invention also provides a method for producing a source of IR-radiation, comprising: providing an enclosure made of a dielectric material defining between its walls a chamber, soaking said chamber in a cleaning agent, thoroughly rinsing said chamber with distilled deionized water, drying said chamber, baking said chamber at a temperature of about between 200°-300° C., introducing in the chamber at least one noble gas, effecting a discharge in the chamber for a period of time and emptying said gas, filling said chamber with a gas mixture containing at least one, molecular, IR-active gas, of at least one buffer gas and of at least one noble gas, and hermetically sealing-off said chamber.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

DETAILED DESCRIPTION OF THE INVENTION

Figure 1:
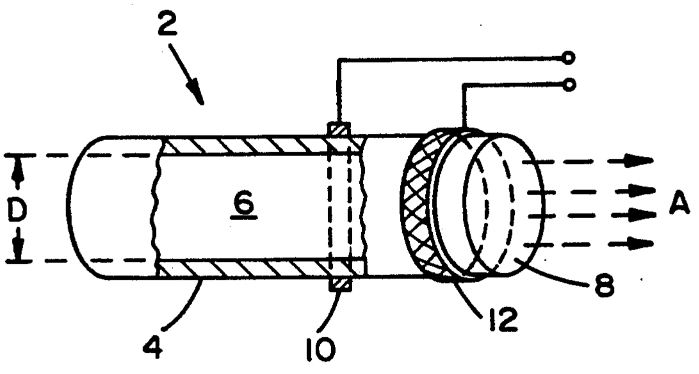
FIG. 1 is a schematic representation, partly in cross-section, of an IR-radiation source according to the present invention.

Referring to FIG. 1, there is illustrated an IR-radiation source 2 constituted by an enclosure 4 defining between its walls a sealed-off chamber 6. The enclosure 4 is made of a dielectric material such as Pyrex$^R$, glass or quartz and has at least one wall 8 transparent to IR-radiation, which radiation, during operation, can be emitted therefrom in the direction of arrows A. In order to excite gas molecules contained inside the chamber 6, the enclosure 4 may, however, be fitted on the outside thereof, with a pair of electrodes 10 and 12 connectable via a cable 14 to an RF driver (not shown) for powering and controlling the source 2.

In accordance with the present invention, the interior of the enclosure 4 is filled with a gas mixture containing:

a) at least one, molecular, IR-active gas capable of emitting IR-radiation of a known discrete spectral distribution when suitably excited;

b) at least one buffer gas having relatively long-living state of excited energy levels, capable of storing the absorbed exciting energy for increasing the rate of excitation and emission of the IR-active gas by the V-V (vibration-vibration) collisional process, and c) at least one noble gas for assisting the initiation of the gas mixture discharge and for increasing the concentration of free electrons in the chamber.

Experiments carried out with such mixtures have shown that in order to achieve an IR-radiation source exhibiting a prolonged life span, an enhanced emission, and/or a suitable modulation of the emitted IR-radiation, several inter-related parameters should be taken into account:

i) the mixture of the above-described three types of gases;

ii) the pressure of the mixture inside the chamber, and iii) the configuration of the chamber.

Considering these interdependent parameters, it can be stated that during the natural decay time of the excited IR-active molecules, e.g., in the order of several milliseconds, the molecules are prone to quenching by three different processes: wall quenching, collisional quenching and self quenching. The wall quenching is caused by the diffusion of excited molecules from a location in the bulk of the gaseous medium to the walls of the enclosure where it is rapidly quenched and the excitation is lost. The average diffusion time for an average size of a source operating at gas pressures which are lower than optimal pressures for high output, is several times faster than the radiative life time. This obviously results in a substantial reduction of the IR intensity of the conversion efficiency of discharge energy compared with the corresponding situation in atomic sources in the visible or U.V. regions of the spectrum. The collisional quenching occurs between the IR-active molecules and other constituents of the mixture, including impurities. Premature quenching of the excited states by collision of excited molecules with other atoms or molecules present in the gas mixtures, results in a decrease of the intensity of the IR-emission and of the efficiency of IR-source.

The nature of a particular quenching agent depends on the specific emitting molecule and on the excited state. For example the 4.27 emission from the (001) state to the (000) state of a $CO_2$ molecule is particularly susceptible to quenching by collision with water or hydrogen molecules.

Finally, molecules in their excited state, emitting characteristic IR-radiation are often quenched by collision with unexcited molecules of the same species. This is called self quenching and it drastically limits the overall pressure of active species permissible in the IR-emitting source. It follows that IR-active molecular species in the source, as well as atomic or molecular buffer species should be maintained at bound pressures not exceeding predetermined values. Since diffusion to the walls of the enclosure is faster at reduced pressure, wall quenching and collisional quenching are interdependent. Thus, only relative large size sources can maintain high emission intensities at considerable power conversion efficiencies.

Examples of IR-radiation sources built and operated, in accordance with the present invention, are as follows:

| EXAMPLE NO. | GAS MIXTURE | RELATIVE PRESSURES |
|---|---|---|
| 1. | $CO_2$,$N_2$,He | 1:4:7 |
| 2. | $CO_2$,$N_2$,He,Xe | 1:2:2:3 |
| 3. | $CO_2$,$N_2$,Xe | 1:2:8 |
| 4. | CO,$N_2$,Xe | 1:1:8 |

The total pressure inside the chamber can vary from 1 to 100 torr.

Figure 2:
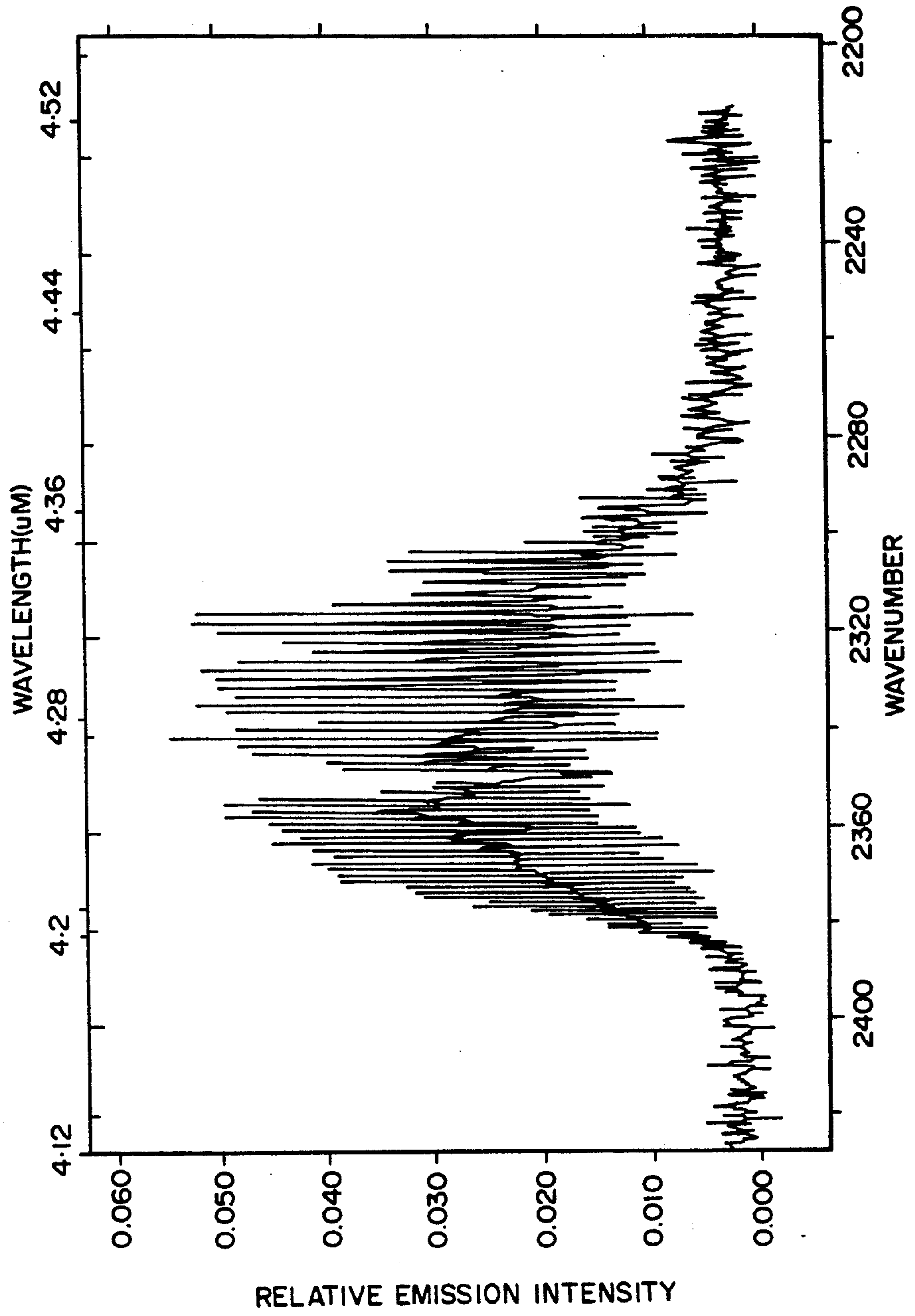
FIG. 2 is a graph showing discrete emission spectrum of an IR-radiation source.

FIG. 2 illustrates the emission intensity of an IR-radiation source comprising $CO_2$, $N_2$, Xe, and He, having relative partial pressures of 1,2,3,3, and a total pressure in the range of 6–25 torr. The source has been excited by an RF oscillator operating at a frequency range of 4–7 $MH_z$ at an average output power of hundreds of milliwatts. The output from the radiation source is in the order of tens of milliwatts.

Figure 3:
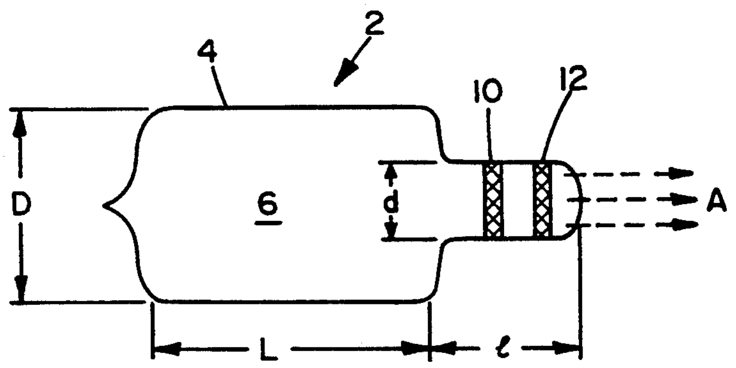
FIG. 3 is a schematic representation of an embodiment of an IR-radiation source according to the invention.
Figure 4:
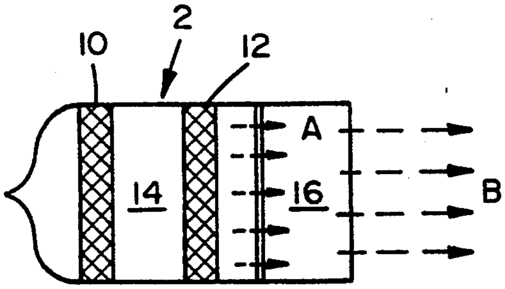
FIG. 4 is a schematic representation of a two compartment IR-radiation source.

Referring now, with reference to FIGS. 3 and 4, to the aspect of the configuration of the IR-radiation sources, this term as used herein is meant to encompass, both, the overall size and shape of an enclosure defining a chamber 6 containing the mixture of the gas.

In a gas mixture of example No. 2, for instance, the lifetime at the (001) vibrational state of a carbon dioxide ($CO_2$) molecule which produces the 4,27 micron emission is approximately 5 milliseconds. It follows that in order to maximize the IR output, the chamber dimensions in the region of the discharge and the gas mixture total and partial pressures should be chosen so as to avoid the possibility that diffusion to the wall could take much less than this time and, that the different collisional relaxing processes will occur at a higher rate than 1/5 milliseconds$=200$ sec$^{-1}$. If, however, it is desired to obtain faster modulation rates of the emitted IR-radiation, the size of the chamber should be small enough so that the diffusion of the molecules to the walls of the chamber will take less than the decay time of the molecule. While for the $CO_2$ molecule the decay time is approximately 5 milliseconds, the decay time for CO (see example No. 4) is about 30 milliseconds.

As seen in FIG. 3, the enclosure 4, is composed of two portions: a first portion of a greater diameter D (about 40 mm) and of a length L (about 50 mm) called the reservoir and of a second portion of a lesser diameter d, (about 15 mm) and of a length I (about 30 mm), called the discharge portion or zone. The two electrodes 10 and 12 are coupled onto the discharge zone. Upon excitation, the desired gas emission exits the chamber 6 in the direction of arrow A. Hence, as can be appreciated, the major volume of the chamber 6 is utilized as a reservoir for constantly replenishing the discharge zone with the same mixture of gas molecules. This type of source configuration increases the life span and stability of the output power of a source.

Experiments made with an IR-radiation source having a configuration of FIG. 3 and filled with a gas mixture of example 2 above, have shown that a duration of a life-span exceeding over 10,000 hours of continuous operation can be achieved. Experiments made with a source containing a gas mixture of Example No. 4, achieved continuous operation exceeding 5000 hours.

Other experimental results which were carried out are summarized in the following tables:

TABLE I

| Pressure Dependence on IR-radiation Decay Time Source configuration of FIG. 1; D = 15 mm; gas mixture of Example No. 3. | | |
|---|---|---|
| Total Pressure in the chamber | Decay Time (msec) | Comparative IR-radiation Output |
| 8 | 4 | 90 |
| 14 | 3 | 70 |
| 18 | 2 | 45 |

TABLE II

| Gas Mixture Dependence on IR-radiation Decay Time Source configuration of FIG. 1: D = 15 mm; total pressure 10 torr. | | |
|---|---|---|
| Gas Mixture $CO_2$,$N_2$,Xe | Decay Time (msec) | Comparative IR-radiation Output |
| 10:20:30 | 4 | 100 |
| 10:1:30 | 2 | 45 |
| 10 1:100 | 3 | 60 |
| 10:1:300 | 2.5 | 40 |

TABLE III

| Gas Chamber Configuration Dependence on IR-Radiation Decay Time Gas mixture of Example No. 3; total pressure 10 torr. | | |
|---|---|---|
| Gas Chamber Diameter (in mm) | Decay Time (msec) | Comparative IR-radiation Output |
| 15 | 5 | 100 |
| 10 | 3.5 | 70 |
| 6 | 2 | 50 |

Turning to FIG. 4, there is illustrated a modified source 2, having two compartments 14 and 16. In the compartment 14 there is introduced a gas mixture according to the invention having a certain active gas, (e.g., $CO_2$). In the compartment 16 there is sealed a gas mixture, however, with an additional active gas, (e.g., $N_2O$ or any other molecule having a dissociation tendency similar to $N_2O$). When discharge occurs in compartment 14, radiation in direction A from tile molecule of said certain active gas enters into the compartment 16 with the additional active gas. In the second compartment 16, the first active molecule will absorb the characteristic radiation emanating from the compartment 14 and by the collisional V—V process, will excite the second active molecule to its vibrational state. Hence a radiation in direction B of the second active gas will be emitted from the compartment 16, without inducing a gas discharge in it.

As it has been hereinbefore described, an essential feature of the present invention is the self-controlled long-life continuous emission IR-radiation source, which is achieved, inter alia, by avoiding, as far as possible, different quenching processes and other causes depleting the IR-active gas in the mixture. In this endeavour, it is proposed to pretreat the interior of the enclosure 4 prior to the introduction of the gas mixture therein as follows:

a) soaking the gas chamber 6 in chemicals. For example, overnight soaking with 30% Nitric Acid in water or Sulphuric Acid + 1% Sodium persulphate, or sulphochromic Acid, or other similar cleaning agents such as Alconox$^R$, Micro$^R$ or Nochromix$^R$;

b) thoroughly rinsing with double-distilled de-ionized water;

c) drying the chamber with e.g., ethanol;

d) baking at 280° C. in a vacuum oven;

e) introducing in the chamber a noble gas, e.g., Xe, effecting a discharge in the chamber for a short period of time and emptying the gas; and f) introducing a gas mixture in the chamber substantially equal to the gas mixture to be used in the source, effecting a discharge for a short period of time, e.g., several minutes, and emptying the gas.

Having baked out and evacuated the chamber, and having effected discharges with gases of the final mixture used, the selected gases, as described hereinbefore, are introduced into the chamber at the calculated ratios and pressures, the chamber is then hermetically sealed-off.

Optionally, the enclosure materials which normally have high relaxing tendency to the IR-active molecules, can be coated with substances which reduce this tendency, for example, Barium Fluoride or Sapphire.

Alternatively, it is proposed to produce the enclosure wall material with a radioactive substance, that while radiating into the chamber, assists in preconditioning the gas mixture inside the enclosure for easy ignition. The same effect can be achieved by adding traces of radioactive gas such as 85 Kr.

Also, in order to maintain a preferred level of IR-active gas molecules, it is suggested in some cases, to add to the mixture gas molecules which will maintain the concentration of the IR-active gas molecules at the desired level. Such an addition may be constituted by e.g., $H_2$ molecules when the IR-active molecules are $CH_4$.

While in the above description there have been given limited examples of IR-active molecules, experiments have shown that many other IR-active molecules are also very useful. Among these there should be mentioned the following gas molecules including rare isotopes:

| | | | | |
|---|---|---|---|---|
| HF | $H_2O^{16}$ | HDS | $SO_2{}^{18}$ | $N^{15}H_3$ |
| DF | $H_2O^{18}$ | $D_2S$ | $SeO_2$ | $PH_3$ |
| HCl | $HDO^{16}$ | $H_2Se$ | $C^{12}O_2$ | $PD_3$ |
| $D^{37}Cl$ | $D_2O^{16}$ | HDSe | $C^{13}O_2$ | $AsH_3$ |
| $D^{35}Cl$ | $D_2O^{18}$ | $D_2Se$ | $C^{14}O_2$ | $AsD_3$ |
| $HB_2$ | THO | $O_3$ | $CS_2$ | $SbH_3$ |
| $DB_2$ | TDO | $N^{14}O_2$ | $CSe_2$ | $SbD_3$ |
| HI | $T_2O$ | $SO_2$ | $NH_3$ | |
| DI | $H_2S$ | $SO^{16}O^{18}$ | $ND_3$ | |

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A source of IR-radiation comprising;

an enclosure defining between its walls a sealed-off, electrode-less chamber, said walls having at least one portion transparent to IR-radiation, and said sealed-off, electrode-less chamber containing a gas mixture of at least one molecular IR-active gas, of at least one buffer gas and of at least one noble gas, said source of IR-radiation emitting discrete, solely noncoherent, spontaneous emission frequencies in the IR-spectrum characteristic of the decay of said at least one molecular IR-active gas from its rotational-vibrational state to its ground state.

2. The source as claimed in claim 1 wherein said IR-active gas is selected from the group of $CO_2$ and CO.

3. The source as claimed in claim 1 wherein said IR-active gas molecule contains at least one rare isotope.

4. The source as claimed in claim I wherein said buffer gas is selected from the group containing $N_2$, CO or a mixture thereof.

5. The source as claimed in claim 1 wherein said noble gas is He or Xe.

6. The source as claimed in claim I wherein said gas mixture, inside a given volume and configuration of said chamber, provides a total pressure at which the average random propelling time to a wall of said chamber exceeds about 5 milliseconds, for maximizing the radiation output power.

7. The source as claimed in claim 1 wherein, for a given volume and configuration of said chamber, the partial pressure of quenching gas particles inside said chamber is such that the collisional quenching rate does not exceed about 200 $sec^{-1}$, for maximizing the radiation output power.

8. The source as claimed in claim I wherein said gas mixture, inside a given volume and configuration of said chamber, is less than about 5 milliseconds for obtaining faster radiation modulation rate.

9. The source as claimed in claim 1 wherein, for a given volume and configuration of said chamber, the partial pressure of quenching gas particles inside said chamber is such that the collisional quenching rate exceed about 200 $sec^{-1}$, for obtaining a faster output radiation modulation rate.

10. The source as claimed in claim 1 wherein said enclosure is provided with two portions, a first larger portion defining a reservoir and a second portion of a smaller size, defining a discharge zone.

11. The source as claimed in claim 1 wherein said enclosure is divided into two compartments, by a partition, said partition being transparent to IR-radiation.

12. The source as claimed in claim 11 wherein a first of said two compartments is filled with said gas mixture and a second of said two compartments is filled with said gas mixture and an additional active gas molecule having a tendency for dissociation similar to that of an $N_2O$ molecule.

13. The source as claimed in claim 1 wherein the walls of said chamber are coated with a material which reduces the tendency of relaxing colliding excited IR-active molecules.

* * * * *

UNITED STATES PATENT AND TRADEMARK OFFICE

CERTIFICATE OF CORRECTION

PATENT NO. : 5,300,859

DATED : April 5, 1994

INVENTOR(S) : Shaul Yatsiv, et al.

It is certified that error appears in the above-indentified patent and that said Letters Patent is hereby corrected as shown below:

Column 4, line 49: "length I" should read --length 1--

Column 5, line 19: "10 1:100" should read --10:1:100--

Column 7, line 11, Claim 4: "claim I" should read --claim 1--

Column 7, line 16, Claim 6: "claim I" should read --claim 1--

Column 8, line 1, Claim 8: "claim I" should read --claim 1--

Signed and Sealed this

Eighth Day of November, 1994

Attest:

Bruce Lehman

BRUCE LEHMAN

*Attesting Officer*

*Commissioner of Patents and Trademarks*

UNITED STATES PATENT AND TRADEMARK OFFICE

CERTIFICATE OF CORRECTION

PATENT NO. : 5,300,859

DATED : April 5, 1994

INVENTOR(S) : Shaul Yatsiv, et al.

It is certified that error appears in the above-indentified patent and that said Letters Patent is hereby corrected as shown below:

On the Title Page, Section [56], under "FOREIGN PATENT DOCUMENTS" after "Germany" insert the following: --1591709 6/1981 Great Britian--

Signed and Sealed this

Twenty-fourth Day of January, 1995

Attest:

BRUCE LEHMAN

*Attesting Officer*

*Commissioner of Patents and Trademarks*